United States Patent
Korczynski et al.

(10) Patent No.: US 11,229,918 B2
(45) Date of Patent: Jan. 25, 2022

(54) NOZZLE AND NOZZLE ASSEMBLY FOR A SERVO VALVE

(71) Applicant: Hamilton Sundstrand Corporation, Charlotte, NC (US)

(72) Inventors: Marcin Korczynski, Wroclaw (PL); Maciej Bujewicz, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 25 days.

(21) Appl. No.: 16/421,713

(22) Filed: May 24, 2019

(65) Prior Publication Data

US 2020/0023385 A1  Jan. 23, 2020

(30) Foreign Application Priority Data

Jul. 19, 2018 (EP) .................... 18461579

(51) Int. Cl.
*B05B 1/10* (2006.01)
*F16L 13/11* (2006.01)
*F16K 31/12* (2006.01)

(52) U.S. Cl.
CPC ............ *B05B 1/10* (2013.01); *F16L 13/11* (2013.01); *F16K 31/12* (2013.01)

(58) Field of Classification Search
CPC ......... B05B 1/10; F16K 31/12; F16K 27/029; F15B 13/0438; F15B 13/0435; F15B 13/0402; F15B 13/043; F15B 2013/008; F15B 5/003; E04C 5/165; F16L 55/16455; F16L 13/11–116; F16L 47/08; F16L 47/02; F16L 41/082; B29C 65/54; B29C 65/542; B29C 66/5221; B29C 2045/14319
See application file for complete search history.

(56) References Cited

U.S. PATENT DOCUMENTS 3,712,339 A * 1/1973 Bartholomaus ..... F15B 13/0438
                                                        137/625.62
4,131,130 A   12/1978 Ruby
4,915,302 A    4/1990 Kraus et al.
(Continued)

FOREIGN PATENT DOCUMENTS

DE    1138596 B    10/1962
DE    1954798 A1    1/1972
(Continued)

OTHER PUBLICATIONS

Extended European Search Report for International Application No. 18461579.7 dated Dec. 14, 2018, 11 pages.

*Primary Examiner* — Tuongminh N Pham
(74) *Attorney, Agent, or Firm* — Cantor Colburn LLP

(57) ABSTRACT

A nozzle for a servo valve comprises an annular body defining an outer circumferential surface and an inner circumferential surface of the nozzle. An annular groove is disposed around the circumference of the annular body in the outer circumferential surface. A nozzle assembly (N) for a servo valve comprises the nozzle and a nozzle housing having a nozzle cavity defined by an inner circumferential cavity surface. The nozzle housing has an annular groove disposed around the circumference of the nozzle cavity in the inner circumferential cavity surface. The nozzle is received within the nozzle cavity such that the annular grooves in the nozzle and the nozzle housing are in fluid communication with each other.

9 Claims, 8 Drawing Sheets

(56) References Cited

U.S. PATENT DOCUMENTS

2012/0043752 A1* 2/2012 McPherson ......... B29C 66/1222
    285/21.1
2015/0252929 A1* 9/2015 Jaspaert ............ B29C 66/72343
    285/41

FOREIGN PATENT DOCUMENTS

| DE | 2906752 A1 | 3/1980 |
| DE | 3630200 A1 | 3/1988 |
| EP | 0311161 A2 | 4/1989 |
| EP | 3205913 A1 | 8/2017 |

* cited by examiner

NOZZLE AND NOZZLE ASSEMBLY FOR A SERVO VALVE

FOREIGN PRIORITY

This application claims priority to European Patent Application No. 18461579.7 filed Jul. 19, 2018, the entire contents of which is incorporated herein by reference.

TECHNICAL FIELD

This disclosure relates to a nozzle and a nozzle assembly for a servo valve.

This disclosure also relates to a servo valve and a method of installing a nozzle in a servo valve.

BACKGROUND

Servo valves are well-known in the art and can be used to control how much fluid is ported to an actuator. Typically, a flapper is deflected by an armature connected to an electric motor away or towards nozzles, which inject the fluid. Deflection of the flapper can control the amount of fluid injected from the nozzles, and thus the amount of fluid communicated to the actuator. In this way, servo valves can allow precise control of actuator movement. Calibration of the servo valve is often required to ensure the correct control of actuator movement is realised, and is achieved by adjusting the axial distance from the nozzle outlet to the flapper.

Typically, the nozzles are interference fitted into a nozzle housing. The interference fit of the nozzle into the housing has to be very tight to ensure that it remains in the correct position within the housing at all operating temperatures. This tight fit can make it difficult to calibrate the servo valve, as it may make it difficult to move the nozzle axially within the nozzle housing. In order to ensure the tight fit, manufacturing tolerances may also have to be relatively strict, which can result in more costly and time consuming manufacture.

SUMMARY

From one aspect, the present disclosure relates to a nozzle for a servo valve in accordance with claim 1.

The annular groove may be axially spaced from the fluid inlet and fluid outlet. For example, the annular groove may be axially spaced from the end of the outer circumferential surface (i.e. from the start of the tapered portion of the nozzle) by at least 10% of the total axial distance of the outer circumferential surface. In other example, the annular groove may be axially spaced from the end of the outer circumferential surface by between 10%-50% of the total axial distance of the outer circumferential surface of the nozzle.

In one embodiment of the above nozzle, the nozzle further comprises at least one vent passage in fluid communication with the annular groove. The vent passage extends through the annular body (in the axial direction) between the inner and outer circumferential surfaces (e.g. substantially parallel to these two surfaces) for at least a portion of its length.

In a further embodiment of any of the above nozzles, the vent passage may extend from the second end of the nozzle to the annular groove. In a further embodiment thereof, the vent passage may extend into a gulley disposed axially across the annular groove. In yet a further embodiment thereof, there may be two vent passages disposed diametrically opposite each other at the second end of the nozzle.

In yet a further embodiment of any of the above nozzles, the nozzle may be provided with a threaded portion at the second end for connection to a calibration tool.

In yet a further embodiment of any of the above nozzles, the annular groove may have a depth at least 10% of the thickness of the annular body between the inner and outer circumferential surfaces. In further embodiments, the depth may be between 10%-60% of the thickness of the annular body between the inner and outer circumferential surfaces of the nozzle.

In yet a further embodiment of any of the above nozzles, the annular groove may have a width (in the axial direction—i.e. an axial length) of at least 10% of the axial length of the circumferential surface of the nozzle. In further embodiments, the width may be between 10% to 50% of the axial length of the outer circumferential surface of the nozzle.

From another aspect, the present disclosure relates to a nozzle assembly for a servo valve.

The annular grooves in the nozzle and nozzle housing may be at least partially aligned (or overlapping) in the axial direction. The annular groove in the nozzle housing may have a similar depth and width (in the axial direction) to the nozzle.

In one embodiment of the above nozzle assembly, the annular groove in the nozzle housing may be wider (along the axial direction) than the annular groove in the nozzle, for example, at least 20% wider. The annular groove in the nozzle housing may be between 20%-100% wider that the annular groove in the nozzle. The annular groove in the nozzle housing may fully overlap the annular groove in the nozzle.

In a further embodiment of the above nozzle assembly, the annular groove in the nozzle housing may be deeper that the annular groove in the nozzle, for example up to 200% deeper.

In a further embodiment of any of the above nozzle assembly, the injection passage may extend from the annular groove in the nozzle housing to the exterior of the housing.

In a further embodiment of any of the above nozzle assemblies, the nozzle cavity may receive a pair of nozzles, and each of the pair of nozzles may be in fluid communication with a respective injection passage. The nozzles may be opposed and may be co-axial.

In yet a further embodiment of any of the above nozzle assemblies, a setting material is disposed in the annular grooves for fixing the nozzle in position within the nozzle housing. In a further embodiment, the setting material may be a plastic material having an operating temperature range at least between −18° C. and 200° C. In yet a further embodiment, the setting material may comprise one of: Polyetherketoneketone (PEKK), Polyether ether ketone (PEEK), Polyphenylene sulfide (PPS), carbon fibre reinforced polymer (CFRP) or Polyvinylidene fluoride (PVDF).

From yet another aspect, the present disclosure relates to a servo valve comprising the nozzle assembly described in the above aspect or any embodiments thereof.

From yet another aspect, the present disclosure relates to a method of calibrating a nozzle.

In one embodiment of the above method, the step of inserting the nozzle in the nozzle cavity comprises engaging a tool to an end of the nozzle.

In a further embodiment of any of the above methods, the nozzle assembly is that of any of the nozzle assembly embodiments discussed above.

BRIEF DESCRIPTION OF DRAWINGS

Some exemplary embodiments of the present disclosure will now be described by way of example only, and with reference to the following drawings in which:

FIG. 5b shows a perspective cross-sectional view of the nozzle assembly of FIG. 5a;

FIG. 6a shows a different cross-sectional view of the nozzle assembly of FIG. 5a; and FIG. 6b shows a cross-sectional view taken along line b-b in the nozzle assembly of FIG. 6a.

DETAILED DESCRIPTION

Figure 1:
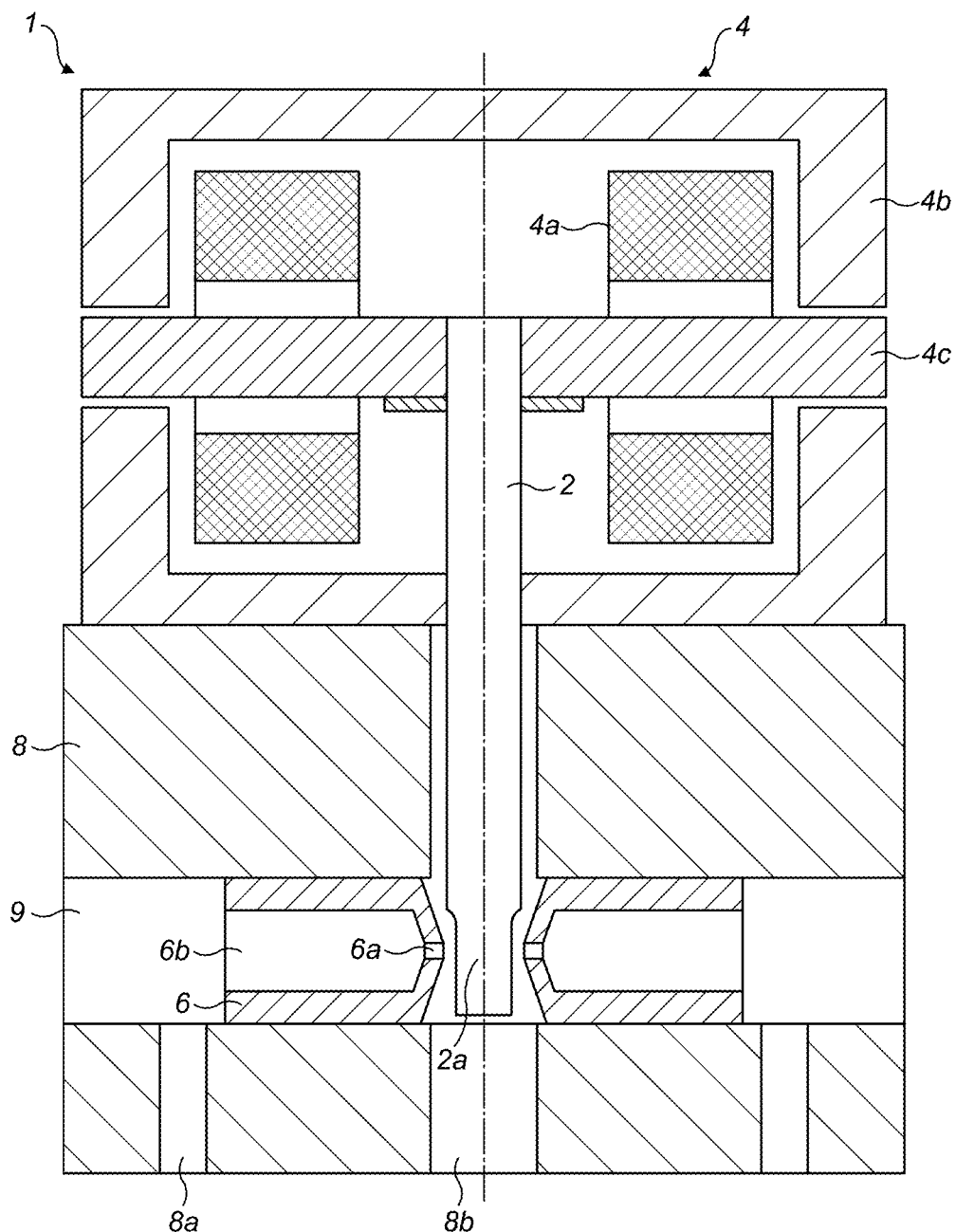
FIG. 1 shows an example of a prior art servo valve.
Figure 2A:
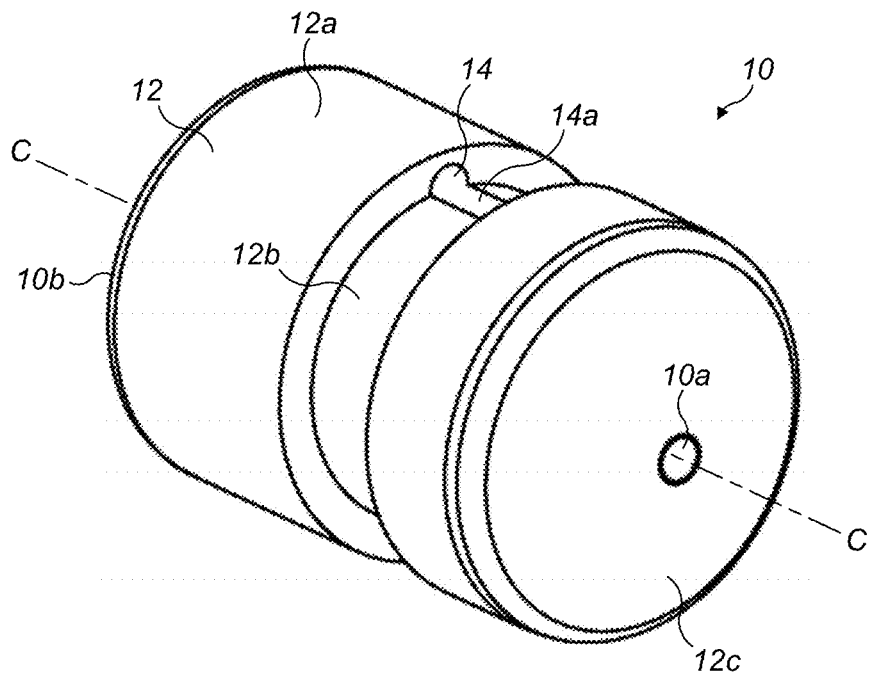
FIGS. 2a and 2b show a perspective and perspective cross-sectional view of an embodiment of a nozzle in accordance with this disclosure.
Figure 2B:
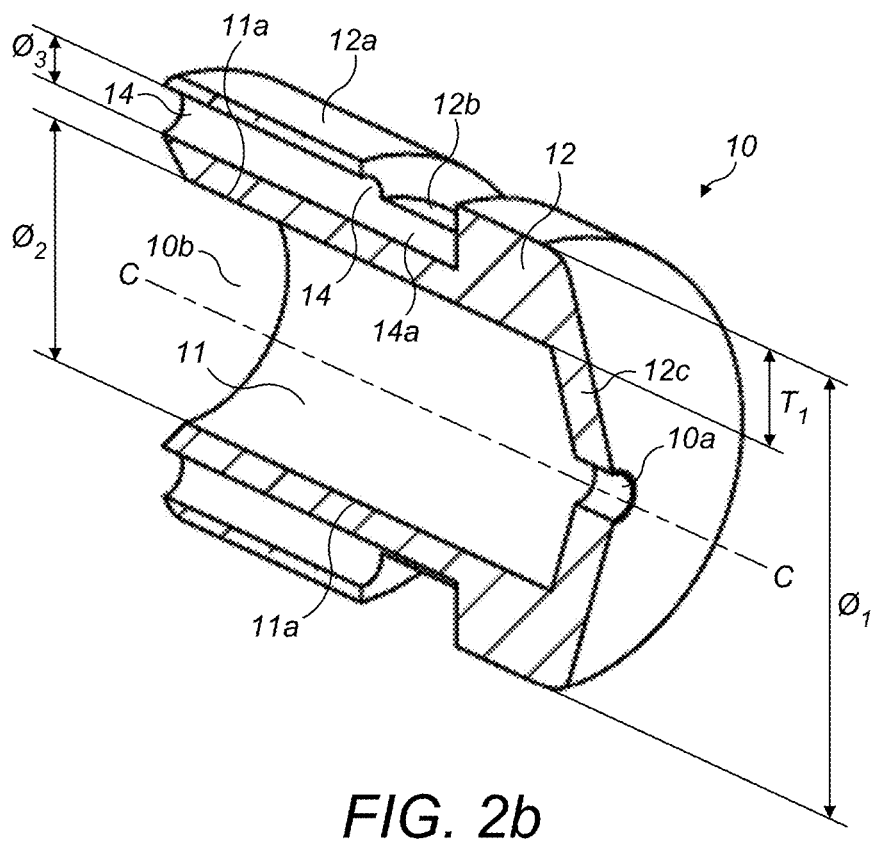
Figure 3A:
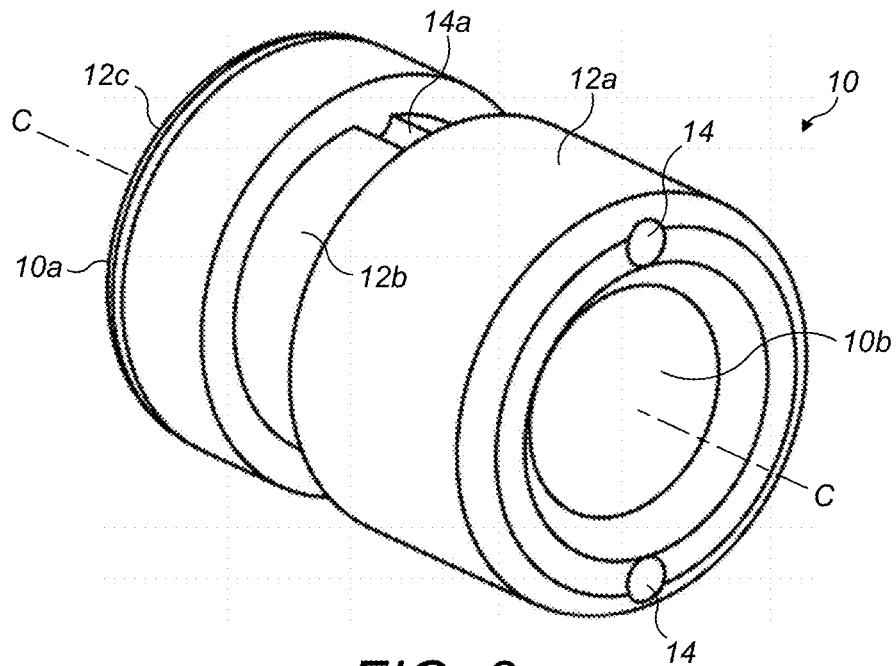
FIGS. 3a and 3b show a different perspective and perspective cross-sectional view of the nozzle of FIGS. 2a and 2b.
Figure 3B:
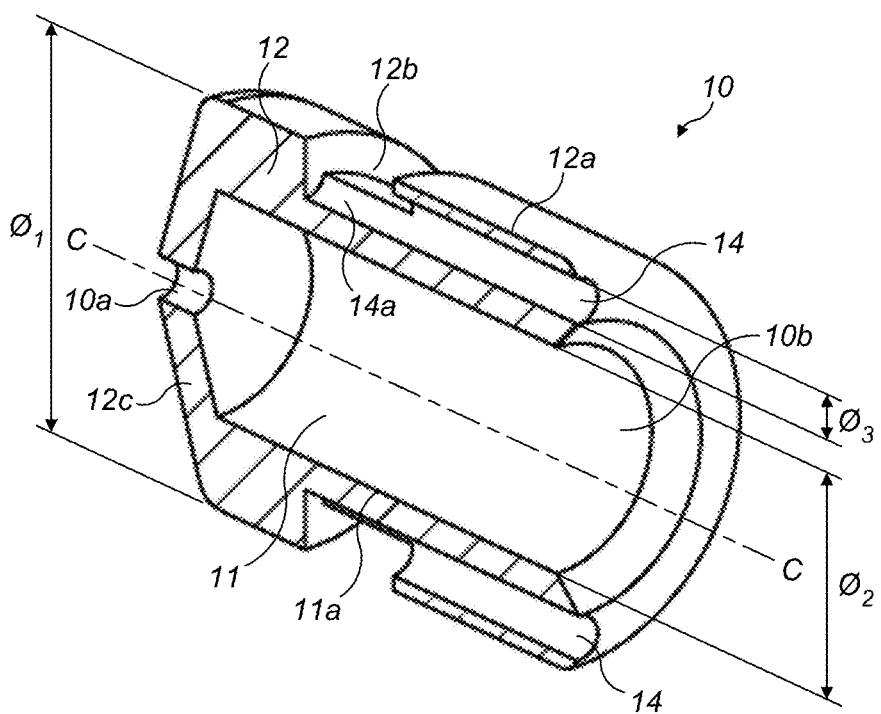
Figure 4C:
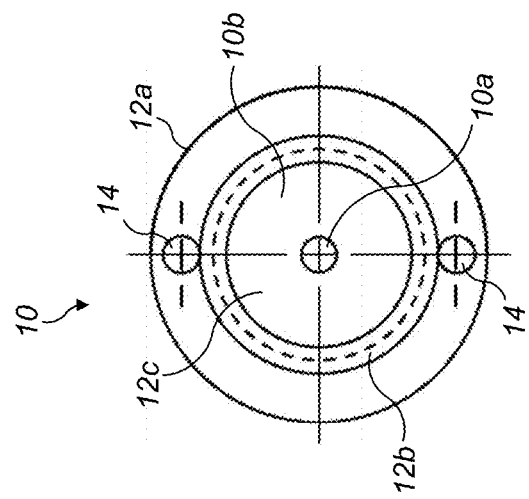
FIGS. 4a to 4c show a front, side and back view of the nozzle of FIGS. 2a, 2b, 3a and 3b.
Figure 4B:
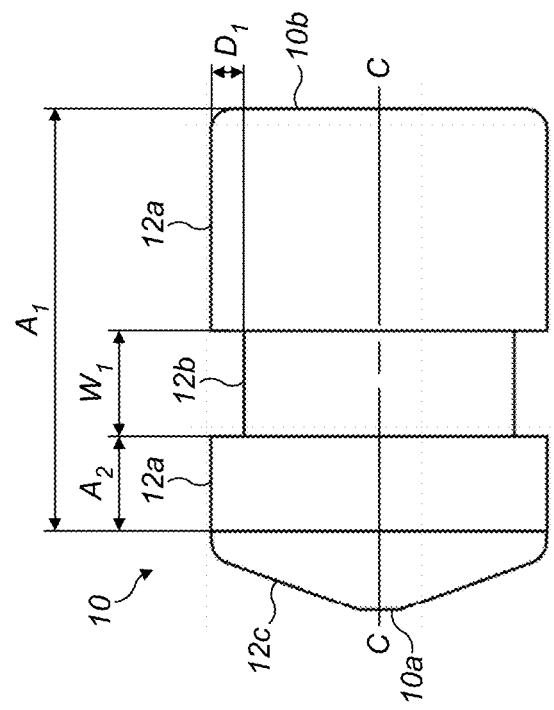
Figure 4A:
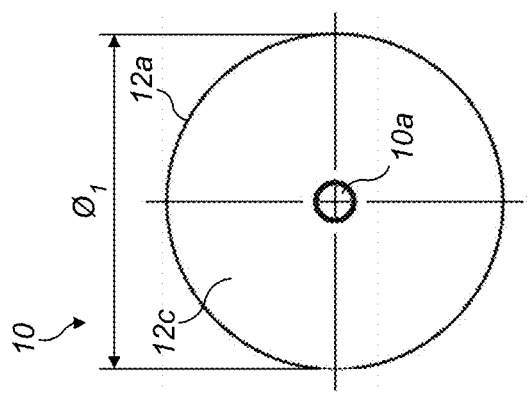

With reference to FIG. 1, a prior art flapper servo valve 1 is illustrated. Servo valve 1 comprises an electric motor 4, flapper 2, a pair of nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to move armature 4c, as is well-known in the art. Flapper 2 is disposed in a flapper cavity 8c in the housing 8 and is attached to an armature 4c, and is deflected by movement of the armature 4c. Nozzles 6 are housed within nozzle housing 8 in a respective nozzle cavity 9, via an interference fit therewith, and comprise a fluid outlet 6a and fluid inlet 6b. Housing 8 also has a port 8a, which allows communication of fluid to the nozzles 6. The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6.

With reference to FIGS. 2a, 2b, 3a, 3b and 4a to 4c, a nozzle 10 in accordance with an embodiment of this disclosure comprises an annular body 12 defining an outer circumferential surface 12a and an inner circumferential surface 11a of the nozzle 10. Nozzle 10 has a central axis C-C, with a fluid outlet 10a at a first axial end of the nozzle 10, and a fluid inlet 10b at an opposing, second axial end of the nozzle 10. Fluid outlet 10a and inlet 10b are in fluid communication with each other, and are connected via a nozzle bore 11, which is defined by the inner circumferential surface 11a of the nozzle 10. Nozzle bore 11 is, in other words, a substantially cylindrical cavity within the annular body 12. Fluid outlet 10a is connected to the annular body 12 by a tapered portion 12c, which in the depicted embodiment is a conical portion. However, another suitable shape of tapered portion 12c may be used, including, for instance, a stepped tapered portion or flat faced portion. In the depicted embodiment, the nozzle 10 has a diameter θ1 of about 6.35 mm, the nozzle bore 11 has a diameter θ2 of about 5.0 mm, and the thickness $T_1$ between the inner and outer circumferential surfaces 11a, 12a is about 1.35 mm.

Nozzle 10 includes an annular groove 12b disposed around the circumference of the annular body 12, and which is disposed in the outer circumferential surface 12a of the nozzle 10. The annular groove 12b may be manufactured integrally as part of the nozzle 10, for example, as part of a casting, forging or pressing operation, or may be machined into the nozzle 10 after it has been formed, for example, using a milling machine or lathe. The annular groove 12b is axially spaced from the fluid inlet and the fluid outlet. For example, the annular groove 12b may be axially spaced from the end of the outer circumferential surface 12a (i.e. from the start of the tapered portion 12c) by a distance $A_2$, which may be at least 10%, and up to 50% of the total axial distance $A_1$ of the outer circumferential surface 12a of the nozzle 10. In the depicted embodiment, the distance $A_1$ is about 8 mm and distance $A_2$ is about 1.8 mm. The annular groove 12b may be any suitable depth $D_1$, for example, at least 10% and up to 60% of the thickness $T_1$ of the annular body 12 between the inner and outer circumferential surfaces 11a, 12a. In the depicted embodiment, the depth $D_1$ is about 0.6 mm. The annular groove 12b may also be any suitable width $W_1$ (in the axial direction, i.e. axial length), for example, at least 10% of the axial length $A_1$ of the circumferential surface 12a of the nozzle 10 and up to 50% of the axial length $A_1$ of the circumferential surface 12a of the nozzle 10. In the depicted embodiment, the width $W_1$ is about 2 mm.

The annular groove 12b may be used to receive a setting material (as will be discussed in more detail below).

Nozzle 10 also includes two vent passages 14 extending through the annular body 12, such that they are in fluid communication with the annular groove 12b. The vent passages 14 extend through the annular body 12 of the nozzle 10 in between the inner and outer circumferential surfaces 11a, 12a (i.e. in the thickness of the annular body 12) parallel to the central axis C-C of the nozzle 10. Vent passages 14 may be used to allow the escape of air and carry excess setting material away from the groove 12b, as discussed below. In the depicted embodiment, the vent passages 14 extend from the second axial end of the nozzle 10, through the annular body 12, and open in to the annular groove 12b. Vent passages 14 are also diametrically opposed across the second axial end of the nozzle 10. However, any suitable positioning and number of vent passages 14 may be used, as well as any suitable positioning of the passages 14 as they extend through the annular body 12. In the depicted embodiment, the vent passages 14 have a diameter θ3 of about 0.7 mm.

In the depicted embodiment, each vent passage 14 extends to a respective gulley 14a that is disposed axially across the annular groove in the inner circumferential surface thereof. Gulleys 14a may act to better direct excess setting material to the vent passages 14, as discussed more below. However, in other embodiments, nozzle 10 may not include them.

Vent passages 14 and/or respective gulleys 14a may be formed integrally as part of the nozzle 10, for example, as part of a casting, forging or pressing operation, or may be machined into the nozzle 10 for example, by drilling or milling after the nozzle 10 has been formed.

The nozzle 10 may be provided with a threaded portion 15 at the second end, proximate the fluid inlet 10b, for connection to a calibration tool to aid calibration of the nozzle in a nozzle assembly (as will be discussed in more detail below).

Figure 5A:
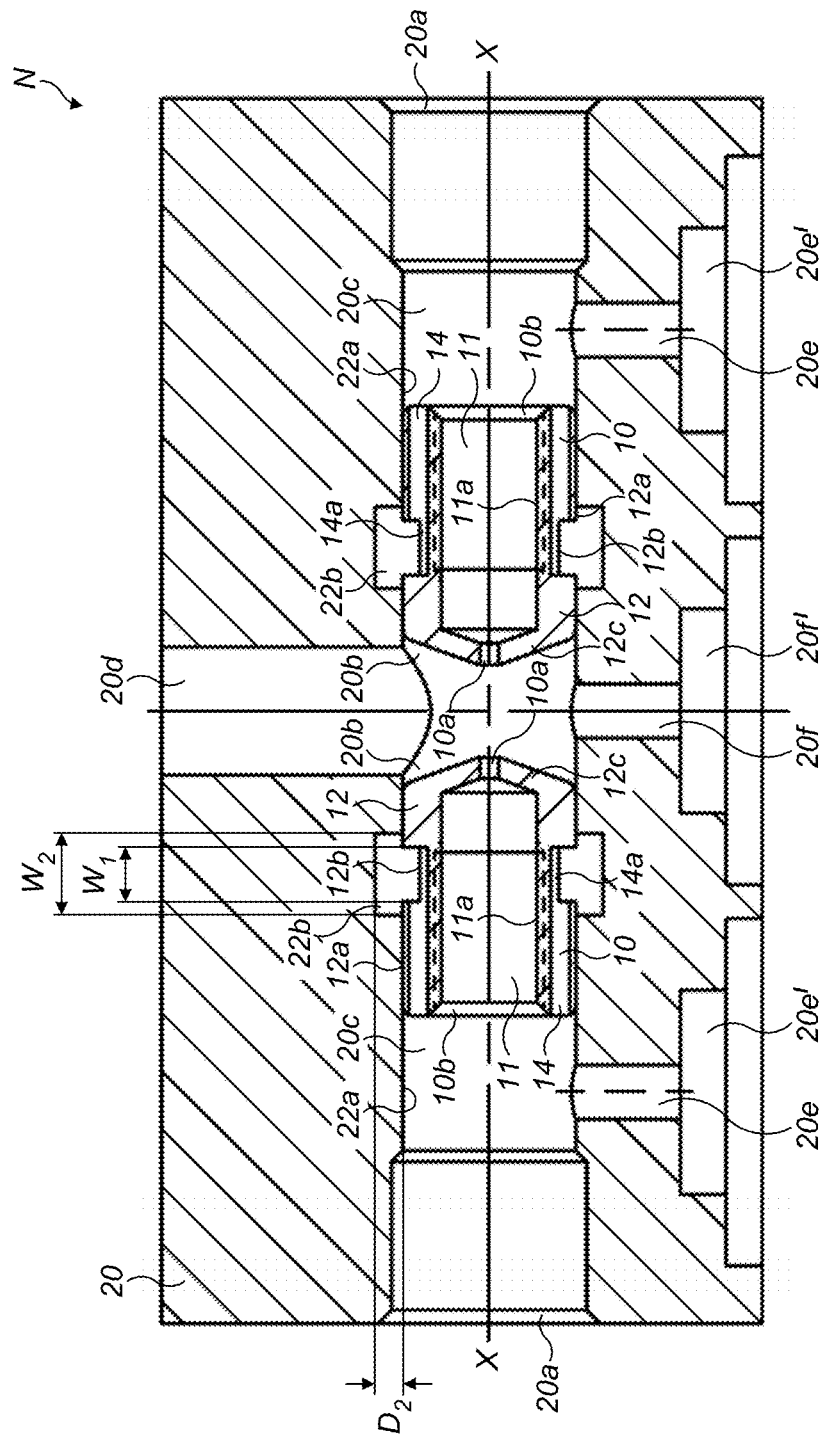
FIG. 5a shows a cross-sectional view of an embodiment of a nozzle assembly in accordance with this disclosure.
Figure 5B:
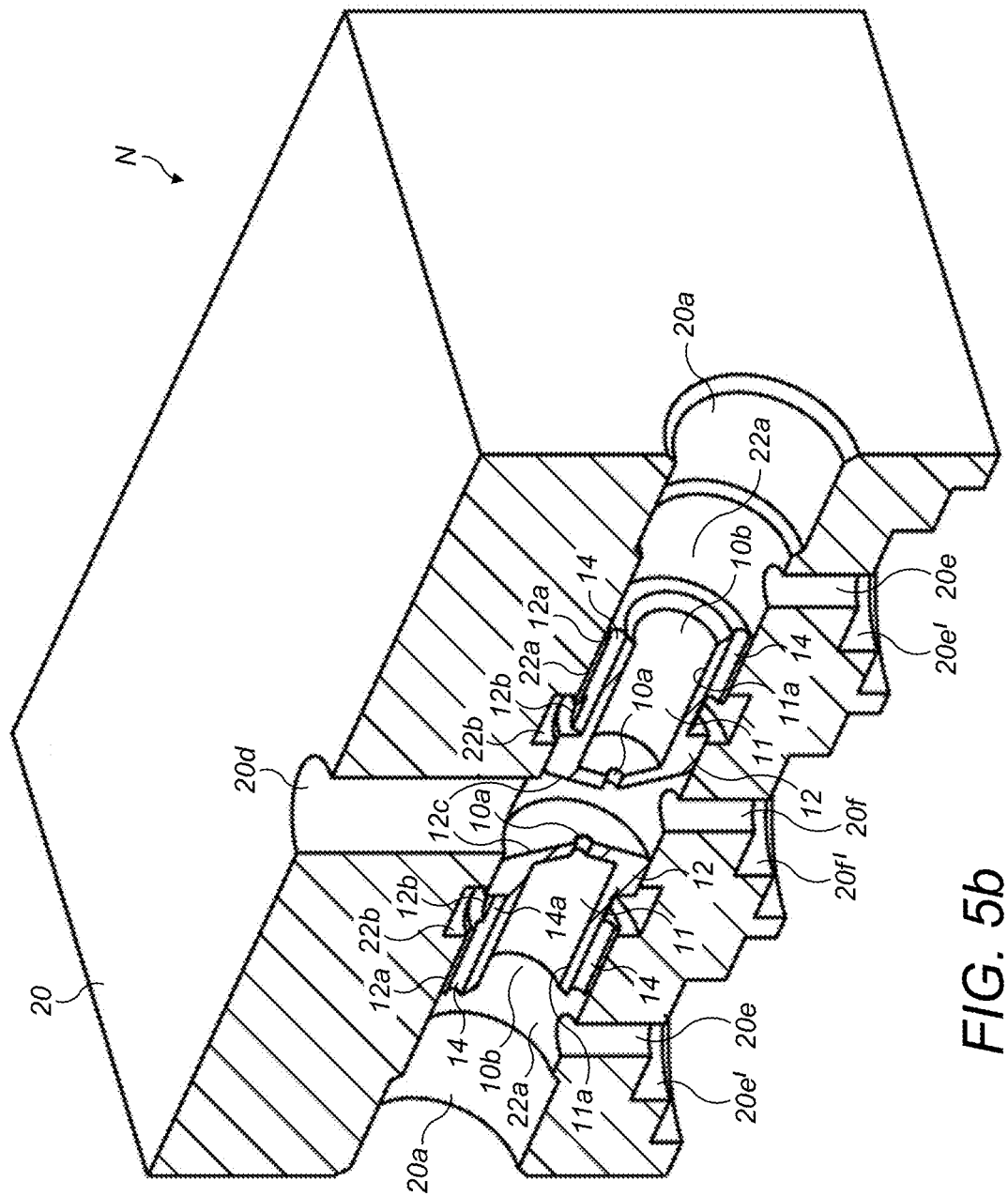

With reference to FIGS. 5a and 5b, a nozzle assembly N for use in a servo valve in accordance with an embodiment of this disclosure comprises a nozzle housing 20 comprising two opposing nozzle cavities 20c having opposing first and second open ends 20a, 20b. The nozzle housing 20 has inlet fluid ports 20e, 20e' for communicating control fluid to the nozzle cavities 20c and outlet fluid ports 20f, 20f for communicating control fluid to a downstream assembly, such as a spool valve (not shown), as explained with reference to FIG. 1. Nozzle housing 20 also comprises a flapper cavity 20d for housing a flapper (not shown), as explained with reference to FIG. 1.

The nozzle cavities 20 have a central axis X-X and are defined by an inner circumferential surface 22a, and are thus, substantially cylindrical. The inner circumferential surface 22a has an annular groove 22b disposed therein for receiving a setting material (as will be discussed in more detail below).

Nozzle cavities 20 receive two opposing nozzles 10 (as discussed above with reference to FIGS. 2a, 2b, 3a, 3b and 4a to 4c). In the depicted embodiment, the central axis X-X of the nozzle cavities 20c is co-axial with the central axis C-C of the nozzles 10, although other configurations may be suitable, as would be understood by one skilled in the prior art.

As shown in FIGS. 5a and 5b, the nozzles 10 are positioned in the nozzle cavities 20c such that annular grooves 12b, 22b of the nozzles 10 and the nozzle cavities 20c at least partially overlap and are in fluid communication with each other. This allows communication of setting material between the grooves 12b, 22b (as will be discussed in more detail below). The depicted positioning is designed to correspond to the operating position of the nozzles 10, which is the position of the nozzles 10 after they have been calibrated for use in the nozzle assembly of a servo valve. Grooves 12b, 22b may be the same size or different sizes compared to each other (for example, groove 22b may be at least a similar depth $D_2$ and width W2 to groove 12b as discussed above), as long as when the nozzles 10 are positioned to their operating position (e.g. via calibration) they at least partially overlap and can allow fluid communication between each other (i.e. to allow communication of the setting material between each other—as will be discussed in more detail below). Larger grooves 12b, 22b (e.g. wider—having a larger axial dimension) allow a larger margin for fine tuning the operating positions of the nozzles 10 (e.g. during calibration), whilst still ensuring at least partial overlap and thus, fluid communication between the grooves 12b, 22b. In the depicted embodiment, the width W2 of the grooves 22b (i.e. width along the axial direction) in the housing 20 is wider than grooves 12b in the nozzles 10, and thus, the grooves 22b completely overlap grooves 12b. For example, the annular grooves 22b in the nozzle housing 20 may be at least 20% wider (in the axial direction), or between 20% and 100% wider (in the axial direction) than the annular grooves 12b in the nozzle 10. In addition or alternatively, the annular grooves 22b in the nozzle housing 20 may be deeper that the annular grooves 12b in the nozzle 10, for example up to 200% deeper. In the depicted embodiment, the width W2 is about 3 mm (which is about 1 mm greater than the width $W_1$ of groove 12b or about 50% wider), and the depth $D_2$ of the grooves 22b is about 1.5 mm (which is about 1 mm deeper than the depth $D_1$ of grooves 12b or about 200% deeper). Such completely overlapping and/or differential depth configurations can lead to a stronger fixing of the nozzle position in the nozzle cavity 20c due to the setting material (as will be discussed in more detail below).

Figure 6A:
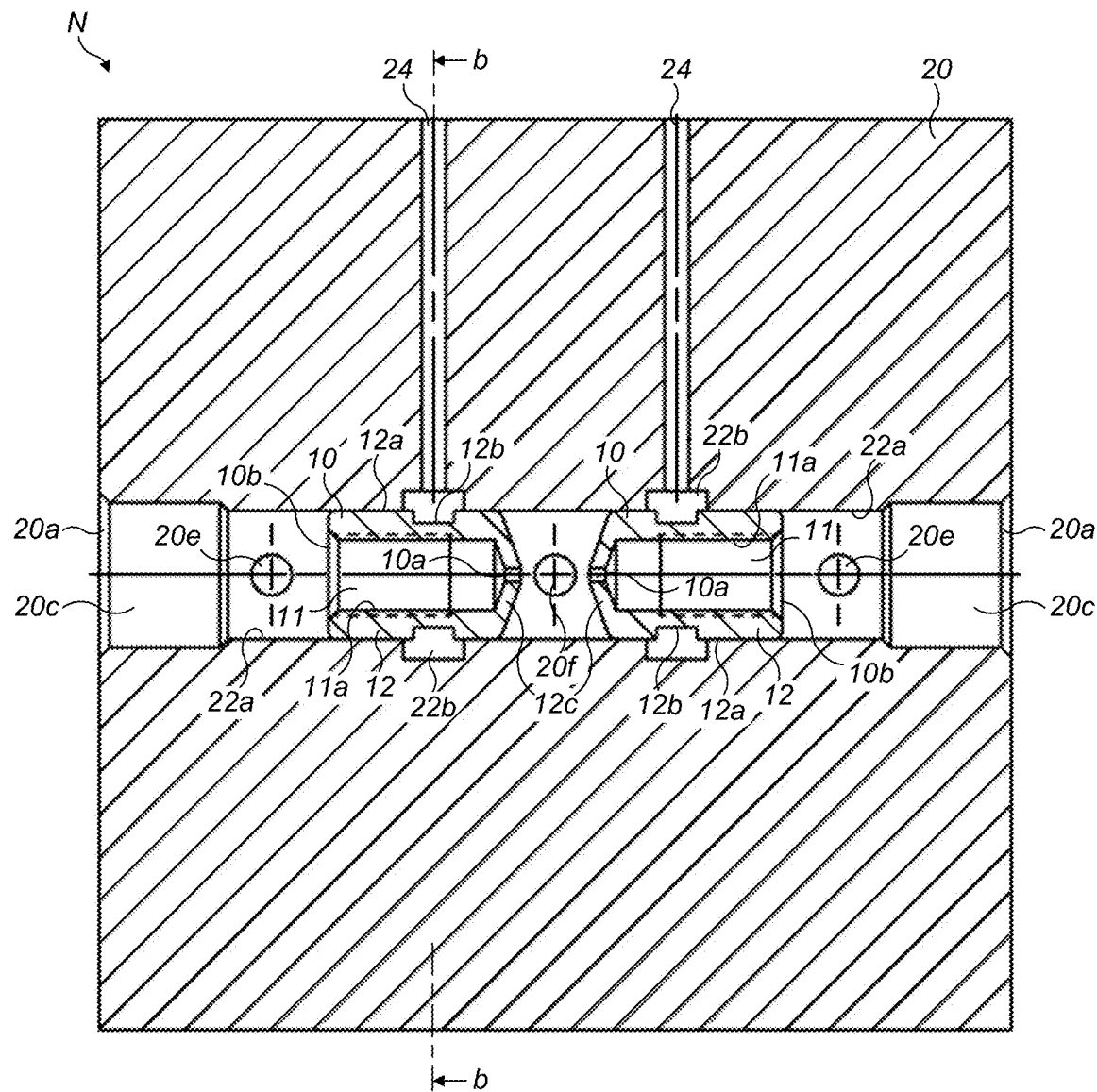
Figure 6B:
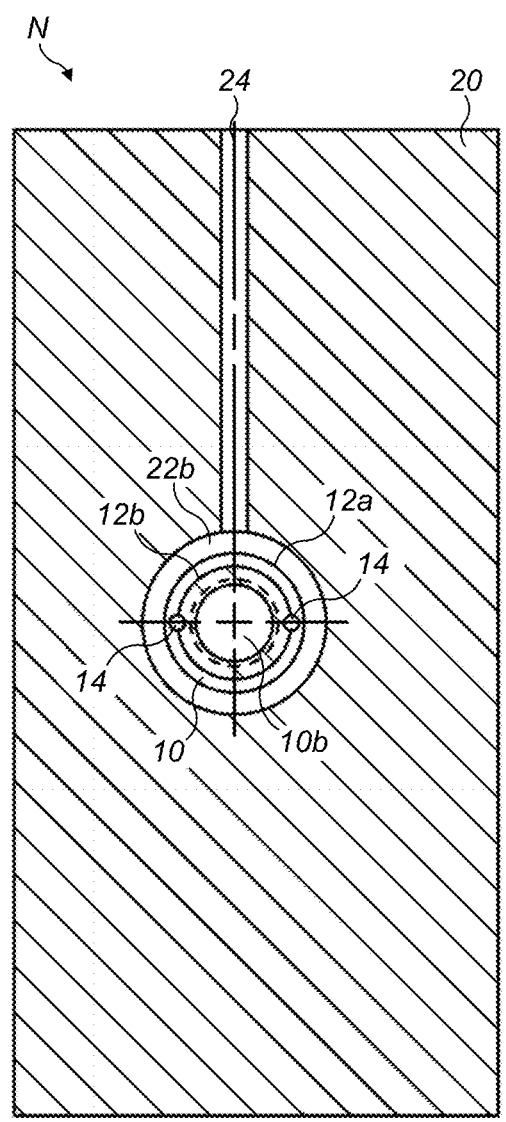

As shown in FIGS. 6a and 6b, the nozzle housing 20 further includes an injection passage 24 in fluid communication with a respective one of each of the grooves 22b of the nozzle cavities 20c. In the depicted embodiment, the injection passages 24 extend from a point external of the housing 20 to each of the housing grooves 22b. In alternative embodiments, injection passages 24 could be present through the nozzle 10 instead of the nozzle housing 20, and accessible via the nozzle cavities 20c. Injection passages 24 allow injection of setting material to the nozzle cavity grooves 22b, which in turn allows communication of the setting material to the nozzle grooves 12b after the nozzles 10 have been calibrated (or vice versa depending on the embodiment).

Although a pair of nozzles and nozzle cavities are shown in FIGS. 5a, 5b and 6a, it is to be understood that only one such nozzle and cavity need be present in some embodiments. An opposing nozzle and cavity may not be necessary in certain designs, or another fluid flow control mechanism could be used in place of the second nozzle and/or cavity.

Installation and calibration of the nozzle 10 will now be described.

The nozzle 10 is firstly placed into the nozzle cavities 20c, which (owing to the embodiments of the present disclosure) need only provide a relatively "loose" fit around the nozzles 10, such that the nozzles 10 are relatively easy to move along the central cavity axis X-X during calibration. The nozzle 10 is moved to its desired axial position in the nozzle cavity 20c, for example using a calibration tool as described above.

Then, a setting material is injected through injection passages 24 to grooves 22b and in turn grooves 12b. During injection, vent passages 14 are used to allow air to escape from the grooves 12b, 22b as setting material flows into the grooves 12b, 22b. Once the grooves 12b, 22b are filled with setting material, any excess setting material may be forced through gulleys 14a and/or vent passages 14, where it may be collected and/or removed from the nozzle assembly N. It is to be noted, however, that gulleys 14a and/or vent passages 14 may be omitted, in embodiments where no "excess" setting material is used, for example, when the exact amount of setting material necessary to fill the grooves 12b, 22b is known and used.

The setting material is configured to fix the nozzle 10 in its desired axial position within the nozzle cavity 20c throughout the operating temperature range and stress levels of the nozzle assembly N. In this sense, the setting material fills the gap between the nozzle 10 and the housing 20, such that the nozzle 10 is fixed in place in the housing 20 and does not move during operation of the nozzle assembly in a servo valve. The grooves 12b, 22b allow sufficient setting material to be collected around the nozzle 10 to ensure it does not move.

In one example, a suitable minimum operating temperature range that the setting material may be configured to operate in is between −18° C. and 200° C., however, this may be differ, depending on the intended use and operating environment of the nozzle assembly N, as would be known to the skilled person.

The setting material can be heated to a liquid form and then injected through injection passages 24 to fill grooves 22b and 12b (as described above). The setting material can then be allowed to cool and solidify after injection, to fill the gap between the nozzle 10 and the housing 20 and fix the nozzle 10 in its calibrated position (i.e. prevent axial movement between the nozzle 10 and the housing 20).

In certain embodiments, the setting material is a plastic material with the aforementioned minimum operating temperature range. However, other suitable materials will be apparent to the skilled person. In general, however, the melting temperature of plastics is relatively low in comparison to the metals and alloys (e.g. aluminium, steel, titanium, nickel-based etc.) typically used to make the nozzles 10 and housing 20. Therefore, they can be injected as liquids without adversely affecting the properties of the nozzle 10 and housing 20. Suitable plastics include Polyetherketoneketone (PEKK), Polyether ether ketone (PEEK), Polyphenylene sulfide (PPS), carbon fibre reinforced polymer (CFRP) or Polyvinylidene fluoride (PVDF), although other plastics may be suitable, as would be apparent to the skilled person. It is thought particularly suitable plastics may be Polyetherketoneketone (PEKK) and Polyether ether ketone (PEEK) due to their relatively high maximum operating temperature.

As discussed above, by using the nozzle grooves 12b, cavity grooves 22b and the setting material therein to fix the nozzle 10 in position, the fit between the nozzle 10 and the housing 20 can be made relatively "loose", which can facilitate calibration. For instance, it reduces the forces necessary to move the nozzle 10 in the nozzle cavity 20c, and may also prevent the "scraping off" of material from the inner circumferential surface 22a of the cavity 20c, whilst the nozzle 10 is moved within it. Such "scraped off" material can contaminate and create malfunctions within the nozzle assembly N or a servo valve. Moreover, facilitating calibration in this manner may also remove the need to provide costly friction reduction surface treatments to the inner circumferential surface 22a of the cavity 20c or the outer circumferential surface 12a of the nozzle 10, as may be necessary if a tight interference fit was needed between the nozzle 10 and the housing 20.

The "loose" fit may also mean that the dimensional tolerances between the nozzle 10 and nozzle housing 20 may be reduced compared to prior art nozzles, which can reduce the cost of manufacturing the nozzle assembly N, as would be apparent to the skilled person.

Although the figures and the accompanying description describe particular embodiments and examples, it is to be understood that the scope of this disclosure is not to be limited to such specific embodiments, and is, instead, to be determined by the following claims.

The invention claimed is:

1. A nozzle assembly (N) for a servo valve, the nozzle assembly (N) comprising:
  a nozzle housing having a nozzle cavity defined by an inner circumferential cavity surface of the nozzle housing;
  a nozzle positioned in the nozzle cavity, wherein the nozzle comprises:
    an annular body defining an outer circumferential surface and an inner circumferential surface;
    a fluid outlet at a first axial end of the nozzle;
    a fluid inlet at an opposing, second axial end of the nozzle;
    a nozzle bore connecting the fluid outlet to the fluid inlet, wherein the nozzle bore is defined by the inner circumferential surface; and
    an annular groove disposed around a circumference of the annular body in the outer circumferential surface;
  an injection passage in fluid communication with the annular groove in the nozzle, wherein the nozzle housing further comprises an annular groove in the inner circumferential cavity surface, and the annular grooves in the nozzle and the nozzle housing are in fluid communication with each other;
  a setting material disposed in the annular grooves for fixing the nozzle in position within the nozzle housing, wherein the injection passage is for injecting the setting material in to the annular grooves; and
  at least one vent passage in fluid communication with the annular groove extending through the annular body between the inner and outer circumferential surfaces.

2. The nozzle assembly (N) of claim 1, wherein the vent passage extends from the second end of the nozzle to the annular groove.

3. The nozzle assembly (N) of claim 1, wherein the vent passage extends into a gulley extending axially across the annular groove.

4. The nozzle assembly (N) of claim 1, wherein the at least one vent passage comprises two vent passages disposed diametrically opposite each other at the second end of the nozzle.

5. The nozzle assembly (N) of claim 1, wherein the nozzle is provided with a threaded portion at the second end for connection to a calibration tool.

6. The nozzle assembly (N) of claim 1, wherein the injection passage extends through the housing, from the annular groove in the nozzle housing to an exterior of the housing.

7. The nozzle assembly (N) of claim 1, wherein the nozzle cavity receives a pair of nozzles, and each of the pair of nozzles is in fluid communication with a respective injection passage.

8. The nozzle assembly (N) of claim 1, wherein the setting material is a plastic material having an operating temperature range at least between −18° C. and 200° C.

9. The nozzle assembly (N) of claim 1, wherein the setting material comprises one of: Polyetherketoneketone (PEKK), Polyether ether ketone (PEEK), Polyphenylene sulfide (PPS), carbon fibre reinforced polymer (CFRP) or Polyvinylidene fluoride (PVDF).

* * * * *